(12) United States Patent
Bouchet

(10) Patent No.: US 12,567,821 B2
(45) Date of Patent: Mar. 3, 2026

(54) METHOD FOR LIMITING THE ELECTRIC POWER REGENERATED BY A SYNCHRONOUS TYPE ELECTRIC MOTOR

(71) Applicant: JTEKT EUROPE, Irigny (FR)

(72) Inventor: Arnaud Bouchet, Oullins (FR)

(73) Assignee: JTEKT EUROPE, Irigny (FR)

( * ) Notice: Subject to any disclaimer, the term of this patent is extended or adjusted under 35 U.S.C. 154(b) by 310 days.

(21) Appl. No.: 18/323,112

(22) Filed: May 24, 2023

(65) Prior Publication Data

US 2023/0402947 A1 Dec. 14, 2023

(30) Foreign Application Priority Data

Jun. 9, 2022 (FR) ...................................... 22/05530

(51) Int. Cl.
H02P 21/22 (2016.01)
H02P 27/06 (2006.01)

(52) U.S. Cl.
CPC .............. H02P 21/22 (2016.02); H02P 27/06 (2013.01)

(58) Field of Classification Search
CPC ............. H02P 21/22; H02P 27/06; H02P 3/14
See application file for complete search history.

(56) References Cited

U.S. PATENT DOCUMENTS

| | | | | |
|---|---|---|---|---|
| 7,759,886 B2 * | 7/2010 | Gallegos-Lopez | .......................... | H02P 21/0089 318/722 |
| 8,228,016 B2 * | 7/2012 | Gallegos-Lopez | .......................... | H02P 21/0003 318/609 |
| 10,439,538 B2 * | 10/2019 | Li | ....................... | G01D 5/24476 |
| 11,646,640 B2 * | 5/2023 | Harada | ..................... | H02P 6/16 318/400.38 |
| 2017/0317633 A1 * | 11/2017 | Li | ........................... | H02P 21/18 |
| 2019/0140564 A1 | 5/2019 | Li et al. | | |
| 2021/0111661 A1 | 4/2021 | Pramod et al. | | |
| 2022/0311311 A1 * | 9/2022 | Harada | ............... | H02P 21/0021 |

FOREIGN PATENT DOCUMENTS

| | | |
|---|---|---|
| CN | 114499311 A | 5/2022 |
| EP | 1 077 527 A1 | 2/2001 |

* cited by examiner

*Primary Examiner* — Thai T Dinh
(74) *Attorney, Agent, or Firm* — Oliff PLC

(57) ABSTRACT

A method for controlling an electric motor (12) comprising at least:
  one first determination step (E1) in which an intermediate value of a direct axis current ($I_{dstat}$) and an intermediate value of a quadrature axis current ($I_{qstat}$) of the AC supply current of the motor (12) are determined,
  one second determination step (E2) in which a target value of the direct axis current ($I_{dcible}$) and a target value of the quadrature axis current ($I_{qcible}$) are determined,
  one driving step (EP) in which the at least one inverter is driven by the microcontroller (20) based on the target value of the direct axis current ($I_{dcible}$) and the target value of the quadrature axis current ($I_{qcible}$).

9 Claims, 1 Drawing Sheet

[Fig.1]
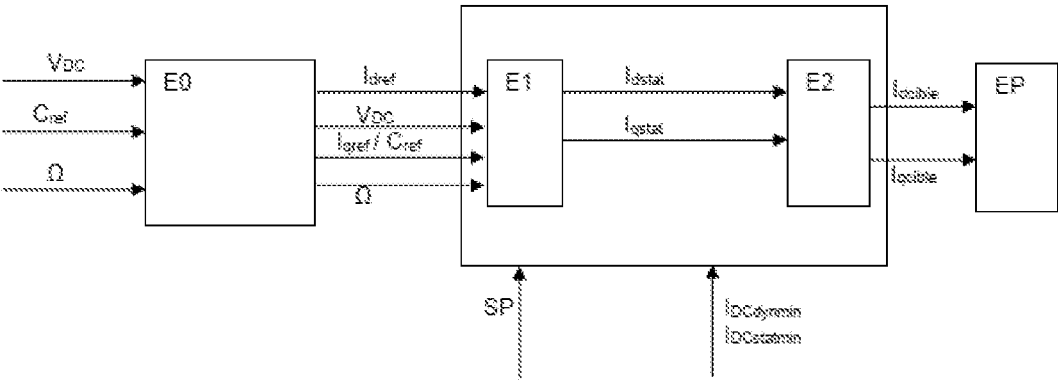
[Fig.2]

METHOD FOR LIMITING THE ELECTRIC POWER REGENERATED BY A SYNCHRONOUS TYPE ELECTRIC MOTOR

The invention concerns the field of electric motors and more particularly a method for limiting the electric power regenerated by a synchronous type electric motor.

The invention applies to an electric motor and more particularly to a synchronous type rotary electric motor, having at least three phases. Said electric motor receives an AC supply current driven by an inverter via the vector control method, said inverter being supplied with a DC supply current.

Vector control, also called field-oriented control, is a known control method for electric motors in which the AC supply current of the motor is transformed into two orthogonal components, one along an axis q, hereafter called quadrature axis current, denoted Iq, and the other along an axis d, is called direct axis current, denoted Id. The quadrature axis current Iq and the direct axis current Id are spatial currents of so-called direct magnetization axis denoted d, and of quadrature axis denoted q. The quadrature axis current Iq and the direct axis current Id correspond to a spatial projection of the three-phase current system on a rotating reference frame related to a rotor of the electric motor. The quadrature axis current Iq and the direct axis current Id are therefore a function of the phase shift of the three-phase current system with respect to the direct axis d and the amplitude of the three-phase system. For low reluctance motors, the direct axis current Id generally enables a reduction in a perceived magnetic flux to optimize a high-speed operation, while the quadrature axis current Iq controls a torque exerted by the motor, hereafter called motor torque. The direct axis current Id and the quadrature axis current Iq are for example determined as a function of an operating point of the motor which is characterized by at least one parameter from among: a setpoint torque, a rotational speed of the motor, a temperature of the motor, or a supply voltage of the motor.

Based on the direct axis current Id and the quadrature axis current Iq, the motor is supplied with the AC supply current provided by the inverter.

By convention, it will be considered in the following description that when the DC supply current of the inverter is positive, the motor-inverter assembly consumes energy, that is to say the current flows from the inverter to the motor, while when the DC supply current of the inverter is negative the motor-inverter assembly generates energy, that is to say the inverter returns current to its DC supply.

In the same way, it is considered that when an electric power is positive, the motor-inverter assembly consumes energy, while when the electric power is negative the motor-inverter assembly generates energy.

During operation of the motor, the DC supply current of the inverter is generally positive but may become negative in some situations. The DC supply current of the inverter, when negative, is also called regenerative current. For example, when the motor is a power steering motor of a vehicle, regenerative current is produced during transitional situations such as a sudden change in the direction of rotation of a steering wheel.

Thereafter, by DC supply system, it should be understood a system upstream of the inverter which is responsible for providing or recovering the continuous energy from the inverter. For example, said upstream system can be a battery or a DC-DC converter.

When the amount of regenerative current is significant, the DC supply system may comprise recovery elements allowing recovering this current.

However, when the amount of regenerative current is small, it is not economically interesting to set up said recovery elements. Thus, the regenerative current degrades the DC supply system.

Thus, there is a need to limit the amount of regenerative current which is produced by the motor-inverter assembly. In other words, there is a need to ensure that the motor-inverter assembly remains an energy consumer regardless of the situation.

There is a solution to reduce the regenerative current using passive elements such as, for example, a resistive element. However, the passive elements can be bulky and expensive.

There are also solutions in which the DC supply current of the inverter is limited with priority over the setpoint torque requested from the motor. These solutions are therefore intrusive because they modify the provided motor torque which no longer corresponds to the requested setpoint torque.

When the motor is a power steering motor, a deviation between the motor torque and the setpoint torque leads to a change in the driver's driving experience.

The present invention aims at overcoming all or part of the aforementioned drawbacks by proposing a method for controlling a synchronous type motor allowing limiting the regenerative current while maintaining the motor torque substantially equal to the setpoint torque and which does not require additional components.

The object of the invention is a method for controlling a synchronous type electric motor, supplied with an AC supply current from at least one inverter, the inverter being driven by at least one microcontroller using a vector control method, the method being executed by the microcontroller and comprising at least:

one first determination step in which an intermediate value of a direct axis current and an intermediate value of a quadrature axis current of the AC supply current of the motor are determined as a function of at least:

one reference setpoint torque or one reference value of the quadrature axis current, one rotational speed of said motor, one supply voltage of the inverter, one static regeneration threshold and, one reference value of the direct axis current, one second determination step in which a target value of the direct axis current and a target value of the quadrature axis current are determined as a function of at least:

the intermediate value of the direct axis current, the intermediate value of the quadrature axis current, one dynamic regeneration threshold, one driving step in which the at least one inverter is driven by the microcontroller based on the target value of the direct axis current and the target value of the quadrature axis current.

In the present description, the terms the reference value of XX, XX referring to the direct axis current or the quadrature axis current, and the reference XX, or the intermediate value of XX and the intermediate XX, or the target value of XX and the target XX, refer to the same current.

The reference setpoint torque is the torque that the motor must exert. The setpoint torque is generally received in the form of software information, processed within the microcontroller, and used as input data of a software function also executed within the microcontroller itself.

The motor torque is the torque actually exerted by the motor. The motor torque depends on the AC supply current of the motor. A user of the motor seeks to ensure that the motor torque is close to or equal to the reference setpoint torque.

Thereafter, by motor system, it should be understood all the elements allowing controlling the electric motor. The motor system includes in particular the motor-inverter assembly, and the microcontroller.

The electric motor according to the invention is supplied with an AC supply current which is provided by the inverter. The inverter itself is electrically supplied with a DC supply current.

The AC supply current of the motor is determined in two successive main steps so that the AC supply current obtained when applying the target values of the direct axis current and the quadrature axis current to the motor allows on the one hand the motor to exert the reference setpoint torque, and on the other hand the DC supply current of the inverter to be greater than a global regeneration threshold.

The global regeneration threshold corresponds to a maximum level of regenerative current that can be generated by the motor-inverter assembly regardless of the operating situations of the motor. In other words, the DC supply current of the inverter will be greater than or equal to the global regeneration threshold. The global regeneration threshold is the minimum value that is imposed on the DC supply current of the inverter. Thus, the method allows limiting the level of regenerative current produced by the motor-inverter assembly while maintaining a motor torque substantially equal to the reference setpoint torque and without requiring additional components.

According to one embodiment, a global regeneration threshold corresponding to a sum of the static regeneration threshold and the dynamic regeneration threshold.

The global regeneration threshold is logically selected to be less than or equal to 0 A so as to control the amount of regenerative current produced without inducing a forced consumption of the motor which would then correspond to a positive value. However, this scenario is technically also feasible. Thus, a global regeneration threshold less than or equal to 0 A corresponds to little or no regenerative current.

The static regeneration threshold is selected by a user of the method. It corresponds to a minimum acceptable value of the DC supply current of the inverter when the motor is in a virtual static situation, that is to say an imaginary situation in which there is a balance of forces. In other words, in the virtual static situation, the motor-inverter assembly does not have any dynamics. The currents within the motor are constant in terms of phase and amplitude.

In the virtual static situation, it is possible to write:

$$P_{stat}=P_{loss}+P_{mec}=V_{DC} \cdot I_{DCstat} \qquad \text{[Math 1]}$$

With $P_{stat}$: the electric power in static mode of the motor-inverter assembly, expressed in Watt. The electric power is positive when the motor-inverter assembly consumes energy, and negative when the motor-inverter assembly generates energy.

$P_{loss}$: the power dissipated by Joule effect in the electrical conductors of the motor-inverter assembly, such as for example a motor winding, a PCB trace, a MOSFET . . . . The power dissipated by Joule effect is always positive, it is expressed in Watt.

$P_{mec}$: the mechanical power of the motor system, expressed in Watt. The mechanical power is positive when the reference motor torque and the rotational speed have the same sign, that is to say positive or negative, and the mechanical power is negative when the reference motor torque and the rotational speed have opposite signs, that is to say one positive and the other negative.

Thus, when the reference motor torque and the rotational speed have opposite signs, it is possible that the electric power of the motor system is negative.

$V_{DC}$: the supply voltage of the inverter, expressed in Volt. The supply voltage of the inverter is always positive.

$I_{DCstat}$: the DC supply current of the inverter in a virtual static situation, expressed in Ampere. The DC supply current is negative when the electric power is negative, and positive when the electric power is positive.

The static regeneration threshold corresponds to the minimum value which is allowed to the DC supply current of the inverter in a virtual static situation.

According to one embodiment, the static regeneration threshold is selected to be positive, zero, or negative depending on the chosen margins.

For a 12V DC supply system having an absorption capacity of –8 A, this threshold can for example be set to –4 A, leaving a margin of 48 W. For a 48V DC supply system having an absorption capacity of –2 A, this threshold can for example be set to –1 A, also leaving a margin of 48 W.

The static regeneration threshold is determined so that:

$$P_{loss}+P_{mec} \geq V_{DC} \cdot I_{DCstatmin} \qquad \text{[Math 2]}$$

With:

$P_{loss}$: the power dissipated by Joule effect in the electrical conductors of the motor-inverter assembly.

$P_{mec}$: the mechanical power of the motor system, expressed in Watt, $V_{DC}$: the supply voltage of the inverter, expressed in Volt, $I_{DCstatmin}$: the static regeneration threshold corresponding to the minimum value of the DC supply current of the inverter, expressed in Ampere.

The dynamic regeneration threshold is selected by the user of the method. It corresponds to a minimum acceptable value of the DC supply current of the inverter when the motor is in a virtual dynamic situation, that is to say an imaginary situation in which only an evolution of the AC supply current of the motor is taken into account.

In the virtual dynamic situation, it is possible to write:

$$P_{dyn}=V_{DC} \cdot I_{DCdyn} \qquad \text{[Math 3]}$$

With $P_{dyn}$: the magnetizing power of the motor stator, expressed in Watt. The magnetizing power is positive when the magnetic energy of the stator increases, that is to say during magnetization, and negative when the magnetic energy of the stator decreases, that is to say during demagnetization.

$V_{DC}$: the supply voltage of the inverter, expressed in Volt. The supply voltage is always positive.

$I_{DCdyn}$: the DC supply current of the inverter, expressed in Ampere. The DC supply current is negative when the power is negative, and positive when the power is positive.

The dynamic regeneration threshold corresponds to the minimum value which is allowed for the demagnetization of the stator in a virtual dynamic situation, that is to say:

$$P_{dyn} \geq V_{DC} \cdot I_{DCdynmin} \qquad \text{[Math 4]}$$

With $P_{dyn}$: the magnetizing power of the motor stator, expressed in Watt, $V_{DC}$: the supply voltage of the inverter, expressed in Volt, $I_{DCdynmin}$: the dynamic regeneration threshold corresponding to the minimum value of the DC supply current of the inverter, expressed in Ampere.

According to one embodiment, the dynamic regeneration threshold is selected to be negative.

According to one embodiment, the intermediate value of the quadrature axis current becomes the target value of the quadrature axis current.

The general principle of the method is to determine, in the first determination step, the AC supply current of the motor in a virtual static situation so that the DC supply current of the inverter in a virtual static situation is in particular greater than or equal to the static regeneration threshold, then to modify, only and if necessary, the direct axis current of the AC supply current of the motor in a virtual static situation so that the DC supply current of the inverter in a virtual dynamic situation is less than or equal to the dynamic regeneration threshold. Indeed, the motor torque being mainly controlled by the quadrature axis current, it is not possible to modify the value of this current without varying the motor torque. However, it is possible to at least partially counterbalance the produced regenerative current by a decrease in the quadrature axis current by a simultaneous increase in the direct axis current so as to contain the sum of the two. Finally, it is thus possible to guarantee that the DC supply current of the inverter in an actual situation is greater than or equal to the global regeneration threshold, that is to say:

$$I_{DC} \geq I_{DCmin} = I_{DCstatmin} + I_{DCdynmin} \qquad \text{[Math 5]}$$

With:

$I_{DC}$: the DC supply current of the inverter, expressed in Ampere;

$I_{DCdynmin}$: the dynamic regeneration threshold corresponding to the minimum value of the DC supply current of the inverter, expressed in Ampere.

$I_{DCstatmin}$: the static regeneration threshold corresponding to the minimum value of the DC supply current of the inverter, expressed in Ampere.

$I_{DCmin}$: the global regeneration threshold, expressed in Ampere.

More specifically, in the method according to the invention, the first determination step allows defining a first value, called intermediate value, for each component of the AC supply current of the motor, that is to say the direct axis current and the quadrature axis current, when the motor-inverter assembly is considered in the virtual static situation. In other words, the method determines the intermediate value of the AC supply current of the motor in the virtual static situation so as to guarantee that the motor exerts the setpoint torque, and to solve the equation Math 1 with the assumption that:

$$I_{DCstat} \geq I_{DCstatmin} \qquad \text{[Math 6]}$$

With: $I_{DCstat}$: the DC supply current of the inverter, expressed in Ampere, in a virtual static situation;

$I_{DCstatmin}$: the static regeneration threshold, expressed in Ampere.

Thus, the intermediate value of the AC supply current of the motor determined in a static situation allows the DC supply current of the inverter to be greater than the static regeneration threshold. In other words, this intermediate value is determined as a function of parameters which allow ensuring on the one hand that the motor exerts the setpoint torque, and on the other hand that the DC supply current of the inverter is greater than the static regeneration threshold.

In the method according to the invention, the second determination step allows defining a second value, called target value, for each component of the AC supply current of the motor as a function of at least the intermediate value of the direct axis current, the intermediate value of the quadrature axis current, and of the dynamic regeneration threshold. In other words, the method determines the target value of the AC supply current of the motor which will be applied to the motor so that the motor exerts the setpoint torque, and that the DC supply current of the inverter is greater than or equal to the global regeneration threshold, by ensuring in particular that:

$$I_{DCdyn} \geq I_{DCdynmin} \qquad \text{[Math 7]}$$

With: $I_{DCdyn}$: the DC supply current of the inverter, expressed in Ampere, in a virtual dynamic situation;

$I_{DCdynmin}$: the dynamic regeneration threshold, expressed in Ampere.

Finally, the method comprises a step of driving the motor based on the target value of the direct axis current and the target value the quadrature axis current.

The invention may also have one or several of the following features taken alone or in combination.

According to one embodiment, the electric motor is a power steering motor of a vehicle.

According to one embodiment, the method comprises a preliminary determination step in which the reference value of the direct axis current and the reference value of the quadrature axis current are determined as a function of at least:

the reference setpoint torque, the rotational speed of said motor, the supply voltage of the inverter The object of the preliminary determination step is to define for the downstream vector control, the reference value of the direct axis current and the reference value of the quadrature axis current among all the pairs of direct axis current and quadrature axis current allowing ensuring the reference setpoint torque.

According to one embodiment, the first determination step and/or the second determination step receives as input at least one system parameter selected from:

A total equivalent resistance on the AC side,

A direct axis and/or quadrature axis inductance of the electric motor,

A magnetic flux of the electric motor,

A number of pole pairs of the electric motor,

A maximum allowable AC supply current of the motor.

According to one embodiment, the microcontroller, to carry out the first determination step, implements in real time a specific algorithm, and/or uses a solution table of the intermediate values stored in a memory.

The solution table lists, for example as a function of at least the rotational speed and the reference setpoint torque, the intermediate values of each pair of direct axis current and quadrature axis current so that the motor torque is substantially equal to the reference setpoint torque and that the DC supply current of the inverter in a virtual static situation is greater than the static regeneration threshold.

Indeed, there are an infinity of pairs of direct axis current and quadrature axis current allowing ensuring that the motor torque is substantially equal to the reference setpoint torque. Thus, it is possible to predict by an algorithm, for example iterative, for each setpoint torque and rotational speed value, a pair of direct axis current and quadrature axis current allowing ensuring, in a virtual static situation, a motor torque substantially equal to the setpoint torque and a DC supply current of the inverter greater than the static regeneration threshold.

For example, the solution table or the specific real-time algorithm must solve the system of equations below for which only the solution offering the negative intermediate value of direct axis current is to be considered:

$$
\begin{cases}
C_{ref} = k.p.I_{qstat}.(\Psi + (L_d - L_q).I_{dstat}) \\
\dfrac{k}{V_{DC}} \cdot \left( \dfrac{R_{ac}.(I_{dstat}^2 + I_{qstat}^2) + p.\Omega.I_{qstat}.}{(\Psi + (L_d - L_q).I_{dstat})} \right) \ge I_{DCstatmin}
\end{cases}
\qquad \text{[Math 8]}
$$

With:

$C_{ref}$: the reference setpoint torque, expressed in N·m;

$I_{qstat}$: the intermediate value of the quadrature axis current;

$I_{dstat}$: the intermediate value of direct axis current;

$\Psi$: the magnetic flux of the electric motor, expressed in Wb;

$L_d$, $L_q$: the direct axis or quadrature axis inductances of the electric motor (H);

$V_{DC}$: the supply voltage of the inverter, expressed in Volt;

$R_{ac}$: the total equivalent resistance on the AC side of the motor system ($\Omega$);

p: the number of pole pairs of the electric motor;

$\Omega$: the rotational speed of the motor, expressed in rad·s$^{-1}$ k: the transformation factor uvm↔dq (3/2 or 1 for example depending on the chosen convention)

$I_{DCstatmin}$: the static regeneration threshold

According to one embodiment, the solution table or the specific real-time algorithm is a function of a parameter selected from: a supply voltage of the inverter, and a temperature of the electric motor.

The intermediate values of the direct axis current and quadrature axis current are highly dependent on a supply voltage of the inverter and/or a temperature of the motor. Thus, the solution table or the specific real-time algorithm can also take these parameters into account.

According to one embodiment, the solution table is established by considering the minimum supply voltage of the inverter and the minimum temperature of the electric motor.

The minimum supply voltage of the inverter is the lowest possible inverter supply voltage of the inverter.

The minimum temperature of the motor is the lowest possible temperature of the considered motor system.

According to one embodiment, the intermediate value of the direct axis current and the intermediate value of the quadrature axis current are determined by interpolation of the solution table or calculated by the specific real-time algorithm.

In the case of a motor having a low or zero reluctance (Ld=Lq), the system is solved very simply so that a real-time implementation will be chosen rather than interpolation by solution table.

According to one embodiment, the second determination step receives as input an equivalent amplitude of the current system of the motor, independently of its phase, achieved during a previous and/or current evaluation.

The equivalent amplitude of the three-phase current system, independently of its phase is for example squared. The second step focuses on controlling the magnetizing/demagnetizing power of the stator winding, hence its dynamic aspect as it assumes an evolution of the currents.

For example, the intermediate value of the direct axis current is modified in the second determination step as a function of a maximum dynamic direct axis current comprising the target value of the AC supply current of the motor achieved during the previous evaluation, the dynamic regeneration threshold, a characteristic quantity of the magnetic behavior, such as for example the inductance of the motor, and a time since the previous evaluation.

The maximum dynamic direct axis current corresponds to the maximum value of direct axis current allowed in order to control the decay of the AC supply current of the motor without interfering with the quadrature axis target current.

The maximum dynamic direct axis current is set to less than or equal to 0.

For example, the maximum dynamic direct axis current can be expressed by the equation below:

$$
C_{corr} = -\sqrt{I_{ciblepre}^2 - I_{qstat}^2 + \dfrac{2.V_{DC}.I_{DCdynmin}.t_e}{k.L}}
\qquad \text{[Math 9]}
$$

With:

$C_{corr}$: the maximum dynamic direct axis current;

$I_{DCdynmin}$: the dynamic regeneration threshold;

$I^2_{qstat}$: the intermediate value of the quadrature axis current;

$I^2_{ciblepre}$: the target value of the AC supply current of the motor achieved during a previous evaluation;

$V_{DC}$: the supply voltage of the inverter expressed in Volt;

$t_e$: a time since the previous evaluation;

L: an inductance of the motor;

k: the transformation factor uvw↔dq (3/2 or 1 for example depending on the chosen convention)

It should be noted that a negative value under the root means a zero maximum dynamic direct axis current.

According to one embodiment, the first determination step comprises an assessment phase in which a comparison of the theoretical regenerative current is performed against the global regeneration threshold.

This comparison is carried out, for example by means of the equation math 10 below, from the rotational speed of the motor, the supply voltage of the inverter, the reference value of the direct axis current, and optionally, the reference setpoint torque or the reference value of the quadrature axis current, one being directly derived from the other once the reference value of the direct axis current is set.

If the comparison of the assessment phase is met, then the reference value of the direct axis current becomes the intermediate value of the direct axis current and the reference value of the quadrature axis current becomes the intermediate value of the quadrature axis current.

If the assessment phase criterion is not met, then the reference value of the direct axis current and the reference value of the quadrature axis current are modified according to the continuation of step 1.

$$
\dfrac{k}{V_{DC}} \cdot \left( R_{ac}.(I_{dref}^2 + I_{qref}^2) + p.\Omega.I_{qstat}.(\Psi + (L_d - L_q).I_{dref}) \right) \ge
\qquad \text{[Math 10]}
$$
$$
I_{DCstatmin}
$$

With:

k: the transformation factor uvw↔dq (3/2 or 1 for example depending on the chosen convention);

$V_{DC}$: the supply voltage of the inverter expressed in Volt;

$R_{ac}$: the total equivalent resistance on the AC side of the motor system ($\Omega$);

p: the number of pole pairs of the electric motor;

$\Omega$: the rotational speed of the motor, expressed in rad·s$^{-1}$ $I_{qstat}$: the intermediate value of the quadrature axis current;

Ψ: the magnetic flux of the electric motor, expressed in Wb;

$L_d$, $L_q$: the direct axis or quadrature axis inductances of the electric motor (H);

$I_{DCstatmin}$: the static regeneration threshold $I_{dref}$: the reference value of the direct axis current, expressed in Ampere;

$I_{qref}$: the reference value of the quadrature axis current, expressed in Ampere.

The invention also relates to a power steering system comprising at least one motor controlled by the method according to the invention.

The invention will be better understood, thanks to the following description, which relates to several embodiments according to the present invention, given as non-limiting examples and explained with reference to the appended schematic drawings, in which:

FIG. 1 is a schematic representation of a power steering system comprising a method according to the invention, FIG. 2 is a diagram of the method according to the invention.

The object of a steering system 1 of a vehicle 2 is to enable a driver to control the vehicle path by modifying an angle of orientation of the vehicle's wheels 10, 11 by means of a steering wheel 3. The angle of orientation of the wheels is in particular related to an angle θ3 of the steering wheel 3. The driver modifies the angle θ3 of the steering wheel 3 by exerting a force T3 on the steering wheel, hereinafter called "steering wheel torque". The force T3 exerted on the steering wheel can be measured by means of a torque sensor 23.

In general, a steering system 1 comprises several elements including said steering wheel 3, a rack 6, and two wheels 10, 11 each connected to a tie rod 8, 9. The rack 6 is the part allowing maneuvering the wheels 10, 11, that is to say allowing modifying the angle of orientation of the wheels 10, 11, via the tie rods 8, 9. The rack 6 transforms a variation of the angle of the steering wheel 3 into a variation of the angle of orientation of the vehicle's wheels 10, 11.

An electric power steering system 1 comprises at least one microcontroller 20 which in particular determines a reference setpoint torque $C_{ref}$ to be applied by an electric motor 12. The motor 12 exerts on the rack 6 a motor torque T12 based on the reference setpoint torque $C_{ref}$. Said reference setpoint torque $C_{ref}$ is determined as a function of different parameters, in particular from the force T3 exerted on the steering wheel 3, received by the microcontroller 20 in a manner known to those skilled in the art.

The electric motor 12 will preferably be an electric motor, with two operating directions, and preferably a synchronous type rotary electric motor, of the brush or brushless type.

The invention applies for example to an electric motor 12 of a mechanical type power steering, that is to say in which there is a mechanical link generally made by a steering column 4 which meshes, by means of a steering pinion 5, on the rack 6, which is itself guided in translation in a casing 7 fastened to the vehicle 2, or an electric power steering system without a mechanical link, called "steer-by-wire", in which the steering wheel is mechanically detached from the rack, not shown in the figures.

In the case of a mechanical type power steering, the electric motor 12 can engage via a reducer of the gear reducer type, either the steering column 4 itself, to form a so-called "single pinion" mechanism, or directly the steering rack 6, for example by means of a second pinion 13 separate from the steering pinion 5 which enables the steering column 4 to mesh with the rack 6, so as to form a so-called "double pinion" mechanism, as shown in FIG. 1.

The invention relates more particularly to a method for controlling a synchronous type electric motor 12 which may be an electric motor 12 of the steering system as shown in FIG. 1 or of another application.

The electric motor 12 is supplied with an AC supply current from an inverter, the inverter being driven by the microcontroller 20 using a vector control method.

The inverter is electrically supplied with a DC supply current $I_{DC}$ of the inverter which has a supply voltage $V_{DC}$. The inverter supplies the electric motor 12 with an AC supply current based on a target value of a direct axis current $I_{dcible}$ and a target value of a quadrature axis current $I_{qcible}$. The motor torque T12 is the torque actually exerted by the motor 12. The motor torque T12 depends on the AC supply current of the motor 12. A user of the motor 12 seeks to ensure that the motor torque T12 is close to or equal to the reference setpoint torque $C_{ref}$.

Thereafter, by motor system, it should be understood all the elements allowing controlling the electric motor 12. The motor system includes in particular the motor-inverter assembly, and the microcontroller 20.

The method is shown in FIG. 2 and comprises a preliminary determination step E0 in which a reference value of the direct axis current $I_{dref}$ and a reference value of the quadrature axis current $I_{qref}$ are determined as a function of at least:

the reference setpoint torque $C_{ref}$, one rotational speed Ω of said motor, the supply voltage $V_{DC}$ of the inverter.

The object of the preliminary determination step E0 is to define, without prejudice on the regenerative current, the reference value of the direct axis current $I_{dref}$ and the reference value of the quadrature axis current $I_{qref}$ to obtain the reference setpoint torque $C_{ref}$. For example, it can be performed in accordance with a so-called 'Maximum Torque Per Ampère' MTPA law offering the best efficiency at low speed, and from a demagnetization strategy ("flux weakening") at high speed when the electromotive force approaches the supply voltage the DC supply current of the inverter.

The microcontroller 20 then carries out a first determination step E1 in which an intermediate value of the direct axis current $I_{dstat}$ and an intermediate value of the quadrature axis current $I_{qstat}$ of the AC supply current of the motor 12 are determined as a function of:

the reference setpoint torque $C_{ref}$ or the reference value of the quadrature axis current $I_{qref}$, the rotational speed Ω of said motor 12, the supply voltage $V_{DC}$ of the inverter, a static regeneration threshold $I_{DCstatmin}$ and, the reference value of the direct axis current $I_{dref}$.

The first determination step E1 allows defining a first value, called intermediate value, for each component of the AC supply current of the motor, that is to say the direct axis current $I_{dstat}$ and the quadrature axis current $I_{qstat}$, when the motor-inverter assembly is considered in the virtual static situation. In other words, the method determines the intermediate value of the AC supply current of the motor in the virtual static situation so as to guarantee that the motor 12 exerts the reference setpoint torque $C_{ref}$ and to guarantee that:

$$I_{DCstat} \geq I_{DCstatmin} \qquad \text{[Math 11]}$$

With: $I_{DCstat}$: the DC supply current of the inverter, expressed in Ampere, in a virtual static situation;

$I_{DCstatmin}$: the static regeneration threshold, expressed in Ampere.

Thus, the intermediate value of the AC supply current of the motor 12 determined in a static situation allows the DC supply current $I_{DC}$ of the inverter to be greater than the static regeneration threshold $I_{DCstatmin}$. In other words, this intermediate value is determined as a function of parameters which allow ensuring on the one hand that the motor 12 exerts the reference setpoint torque $C_{ref}$, and on the other hand that the DC supply current of the inverter $I_{DCstat}$ is greater than the static regeneration threshold $I_{DCstatmin}$.

According to one embodiment, the microcontroller 20, to carry out the first determination step E1, implements in real time a specific algorithm, and/or uses a solution table of intermediate values stored in a memory.

The solution table lists, for example as a function of at least the rotational speed $\Omega$ and the reference setpoint torque $C_{ref}$, the intermediate values of each pair of direct axis current $I_{dstat}$ and quadrature axis current $I_{qstat}$ so that the motor torque T12 is substantially equal to the reference setpoint torque $C_{ref}$ and that the DC supply current of the inverter $I_{DCstat}$ in a virtual static situation is greater than the static regeneration threshold $I_{DCstatmin}$.

Indeed, there are an infinity of pairs of direct axis current and quadrature axis current allowing ensuring that the motor torque T12 is substantially equal to the reference setpoint torque $C_{ref}$. Thus, it is possible to predict by an algorithm, for example iterative, for each setpoint torque $C_{ref}$ and rotational speed $\Omega$ value, a pair of direct axis current and quadrature axis current allowing ensuring, in a virtual static situation, a motor torque T12 substantially equal to the reference setpoint torque $C_{ref}$ and a DC supply current $I_{DCstat}$ of the inverter greater than the static regeneration threshold $I_{DCstatmin}$.

For example, the solution table or the specific real-time algorithm must solve the system of equations below for which only the solution offering the negative intermediate value of direct axis current is to be considered $$\begin{cases} C_{ref} = k.p.I_{qstat}.(\Psi + (L_d - L_q).I_{dstat}) \\ \dfrac{k}{V_{DC}} \cdot \left( \dfrac{R_{ac}.(I_{dstat}^2 + I_{qstat}^2) + p.\Omega.I_{qstat}.}{(\Psi + (L_d - L_q).I_{dstat})} \right) \geq I_{DCstatmin} \end{cases}$$ [Math 12]

With $C_{ref}$: the reference setpoint torque, expressed in N·m;

$I_{qstat}$: the intermediate value of the quadrature axis current;

$I_{dstat}$: the intermediate value of direct axis current;

$\Psi$: the magnetic flux of the electric motor, expressed in Wb;

$L_d$, $L_q$: the direct axis or quadrature axis inductances of the electric motor (H);

$V_{DC}$: the supply voltage of the inverter, expressed in Volt;

$R_{ac}$: the total equivalent resistance on the AC side of the motor system ($\Omega$);

p: the number of pole pairs of the electric motor;

$\Omega$: the rotational speed of the motor, expressed in rad·s$^{-1}$ $I_{DCstatmin}$: the static regeneration threshold k: the transformation factor uvm$\leftrightarrow$dq (3/2 or 1 for example depending on the chosen convention)

According to one embodiment, the solution table or the specific real-time algorithm is a function of a parameter selected from: the supply voltage $V_{DC}$ of the inverter, and a temperature of the electric motor 12.

The intermediate values of the direct axis current $I_{dstat}$ and the quadrature axis current $I_{qstat}$ are highly dependent on the supply voltage $V_{DC}$ of the inverter and/or a temperature of the motor. Thus, the solution table or the specific real-time algorithm can also take these parameters into account.

According to one embodiment, the solution table is established by considering the minimum supply voltage of the inverter and the minimum temperature of the electric motor.

The minimum supply voltage of the inverter is the lowest possible inverter supply voltage $V_{DC}$ of the inverter.

The minimum motor temperature is the lowest possible temperature of the considered motor system 12.

According to one embodiment, the intermediate value of the direct axis current $I_{dstat}$ and the intermediate value of the quadrature axis current $I_{qstat}$ are determined by interpolation of the solution table or by the specific real-time algorithm.

According to one embodiment, the first determination step E1 comprises an assessment phase in which a comparison of the theoretical regenerative current is performed against a global regeneration threshold $I_{DCmin}$.

This comparison is carried out, for example by means of the equation math 13 below, from the rotational speed $\Omega$ of the motor 12, the supply voltage of the inverter $V_{DC}$, the reference value of the direct axis current $I_{dref}$, and optionally, the reference setpoint torque $C_{ref}$ or the reference value of the quadrature axis current $I_{qref}$, one being directly derived from the other once the reference value of the direct axis current $I_{dref}$ is set.

If the comparison of the assessment phase is met, then the reference value of the direct axis current $I_{dref}$ becomes the intermediate value of the direct axis current $I_{dstat}$ and the reference value of the quadrature axis current $I_{qref}$ becomes the intermediate value of the quadrature axis current $I_{qstat}$.

If the assessment phase criterion is not met, then the reference value of the direct axis current $I_{dref}$ and the reference value of the quadrature axis current $I_{qref}$ are modified according to the continuation of step 1.

$$\frac{k}{V_{DC}} \cdot \left( R_{ac}.(I_{dref}^2 + I_{qref}^2) + p.\Omega.I_{qstat}.(\Psi + (L_d - L_q).I_{dref}) \right) \geq$$ [Math 13]

$$I_{DCstatmin}$$

With:

k: the transformation factor uvw$\leftrightarrow$dq (3/2 or 1 for example depending on the chosen convention);

$V_{DC}$: the supply voltage of the inverter expressed in Volt;

$R_{ac}$: the total equivalent resistance on the AC side of the motor system ($\Omega$);

p: the number of pole pairs of the electric motor;

$\Omega$: the rotational speed of the motor, expressed in rad·s$^{-1}$ $I_{qstat}$: the intermediate value of the quadrature axis current;

$\Psi$: the magnetic flux of the electric motor, expressed in Wb;

$L_d$, $L_q$: the direct axis or quadrature axis inductances of the electric motor (H);

$I_{DCstatmin}$: the static regeneration threshold $I_{dref}$: the reference value of the direct axis current, expressed in Ampere;

$I_{qref}$: the reference value of the quadrature axis current, expressed in Ampere.

The microcontroller 20 then carries out a second determination step E2 in which the target value of the direct axis current $I_{dcible}$ and the target value of the quadrature axis current $I_{qcible}$ are determined as a function of:

the intermediate value of the direct axis current $I_{dstat}$, the intermediate value of the quadrature axis current $I_{qstat}$, one dynamic regeneration threshold $I_{DCdynmin}$, The second determination step E2 allows defining a second value, called target value, for each component of the AC supply current of the motor as a function of at least the intermediate value of the direct axis current $I_{dstat}$, the intermediate value of the quadrature axis current $I_{dstat}$, and the dynamic regeneration threshold $I_{DCdynmin}$. In other words, the method determines the target value of the AC supply current of the motor which will be applied to the motor 12 so that the motor 12 exerts the reference setpoint torque $C_{ref}$, and that the DC supply current $I_{DC}$ of the inverter is greater than or equal to the global regeneration threshold $I_{DCmin}$, by ensuring in particular that:

$$I_{DCdyn} \geq I_{DCdynmin} \qquad \text{[Math 14]}$$

With: $I_{DCdyn}$: the DC supply current of the inverter, expressed in Ampere, in a virtual dynamic situation;

$I_{DCdynmin}$: the dynamic regeneration threshold, expressed in Ampere.

According to one embodiment, the second determination step E2 receives as input an equivalent amplitude of the current system of the motor, independently of its phase, achieved during a previous and/or current evaluation.

The equivalent amplitude of the three-phase current system, independently of its phase is for example squared. The second step focuses on controlling the magnetizing/demagnetizing power of the stator winding, hence its dynamic aspect as it assumes an evolution of the currents. For example, the intermediate value of the direct axis current $I_{dstat}$ is modified in the second determination step E2 as a function of a maximum dynamic direct axis current $C_{corr}$ comprising the target value of the AC supply current of the motor 12 achieved during the previous evaluation, the dynamic regeneration threshold $I_{DCdynmin}$, a characteristic quantity of the magnetic behavior, such as for example the inductance of the motor, and a time since the previous evaluation.

The maximum dynamic direct axis current corresponds to the maximum value of direct axis current allowed in order to control the decay of the AC supply current of the motor without interfering with the quadrature axis target current.

The maximum dynamic direct axis current is set to less than or equal to 0.

For example, the maximum dynamic direct axis current $C_{corr}$ can be, for example, expressed by the equation below:

$$C_{corr} = -\sqrt{I_{ciblepre}^2 - I_{qstat}^2 + \frac{2.V_{DC}.I_{DCdynmin}.t_e}{k.L}} \qquad \text{[Math 15]}$$

With:
$C_{corr}$: the maximum dynamic direct axis current;
$I_{DCdynmin}$: the dynamic regeneration threshold;
$I_{qstat}^2$: the intermediate value of the quadrature axis current;
$I_{ciblepre}^2$: the target value of the AC supply current of the motor achieved during a previous evaluation;
$V_{DC}$: the supply voltage of the inverter expressed in Volt;
$t_e$: a time since the previous evaluation;
k: the transformation factor uvw↔dq (3/2 or 1 for example depending on the chosen convention)
L: an inductance of the motor.

It should be noted that a negative value under the root means a zero maximum dynamic direct axis current.

According to one embodiment, the first determination step E1 and/or the second determination step E2 receives as input at least one system parameter selected from:

A total equivalent resistance $R_{ac}$ on the AC side,
A direct axis inductance $L_d$ and/or quadrature axis inductance $L_q$ of the electric motor 12,
A magnetic flux $\Psi$ of the electric motor 12,
A number of pole pairs p of the electric motor 12,
A maximum allowable AC supply current of the motor.

Finally, the microcontroller 20 carries out a driving step EP in which the inverter is driven by the vector control method based on the target value of the direct axis current $I_{dcible}$ and the target value of the quadrature axis current $I_{qcible}$.

According to the method of the invention, the AC supply current of the motor is determined in two successive main steps so that the AC supply current obtained when applying the target values of the direct axis current $I_{dcible}$ and the quadrature axis current $I_{qcible}$ to the motor 12 allows on the one hand the motor 12 to exert the reference setpoint torque $C_{ref}$, and on the other hand the DC supply current $I_{DC}$ of the inverter to be greater than the global regeneration threshold $I_{DCmin}$.

The global regeneration threshold $I_{DCmin}$ corresponds to a maximum level of regenerative current that can be generated by the motor-inverter assembly regardless of the operating situations of the motor. In other words, the DC supply current $I_{DC}$ of the inverter will be greater than or equal to the global regeneration threshold $I_{DCmin}$. The global regeneration threshold $I_{DCmin}$ is the minimum value that is allowed to the DC supply current $I_{DC}$ of the inverter. Thus, the method allows limiting the level of regenerative current produced by the motor-inverter assembly while maintaining a motor torque T12 substantially equal to the reference setpoint torque $C_{ref}$ and without requiring additional components.

The global regeneration threshold $I_{DCmin}$ corresponding to a sum of the static regeneration threshold $I_{DCstatmin}$ and the dynamic regeneration threshold $I_{DCdynmin}$ is logically selected to be less than or equal to 0 A so as to control the amount of regenerative current produced without inducing a forced consumption of the motor which would then correspond to a positive value. However, this scenario is technically also feasible. Thus, a global regeneration threshold less than or equal to 0 A corresponds to little or no regenerative current.

The static regeneration threshold $I_{DCstat}$ is selected by a user of the method. It corresponds to a minimum acceptable value of the DC supply current $I_{DCstat}$ of the inverter when the motor is in a virtual static situation, that is to say an imaginary situation in which there is a balance of forces. In other words, in the virtual static situation, the motor-inverter assembly does not have any dynamics. The currents within the motor are constant in terms of phase and amplitude.

In the virtual static situation, it is possible to write:

$$P_{stat} = P_{loss} + P_{mec} = V_{DC}.I_{DCstat} \qquad \text{[Math 16]}$$

With $P_{stat}$: the electric power in static mode of the motor-inverter assembly, expressed in Watt. The electric power $P_{stat}$ is positive when the motor-inverter assembly consumes energy, and negative when the motor-inverter assembly generates energy.

$P_{loss}$: the power dissipated by Joule effect in the electrical conductors of the motor-inverter assembly, such as for example a motor winding, a PCB trace, a MOSFET . . . . The power dissipated by Joule effect $P_{loss}$ is always positive, it is expressed in Watt.

$P_{mec}$: the mechanical power of the motor system, expressed in Watt. The mechanical power $P_{mec}$ is positive when the reference motor torque and the rotational speed $\Omega$ have the same sign, that is to say positive or negative, and the mechanical power $P_{mec}$ is negative when the reference motor torque and the rotational speed $\Omega$ have opposite signs, that is to say one positive and the other negative.

Thus, when the reference motor torque and the rotational speed $\Omega$ have opposite signs, it is possible that the electric power $P_{stat}$ of the motor system is negative.

$V_{DC}$: the supply voltage of the inverter, expressed in Volt. The supply voltage $V_{DC}$ of the inverter is always positive.

$I_{DCstat}$: the DC supply current of the inverter, expressed in Ampere, in a static situation. The DC supply current $I_{DCstat}$ is negative when the electric power is negative, and positive when the electric power is positive.

The static regeneration threshold $I_{DCstatmin}$ corresponds to the minimum value that is allowed to the DC supply current $I_{DCstat}$ of the inverter in a virtual static situation.

The static regeneration threshold $I_{DCstatmin}$ is selected to be positive, zero, or negative depending on the chosen margins.

For a 12V DC supply system having an absorption capacity of $-8$ A, this threshold can for example be set to $-4$ A, leaving a margin of 48 W. For a 48V DC supply system having an absorption capacity of $-2$ A, this threshold can for example be set to $-1$ A, also leaving a margin of 48 W.

It is negative for situations where little or no regenerated current is desired.

The static regeneration threshold $I_{DCstatmin}$ is determined so that:

$$P_{loss}+P_{mec} \geq V_{DC} \cdot I_{DCstatmin} \qquad \text{[Math 17]}$$

With:

$P_{loss}$: the power dissipated by Joule effect in the electrical conductors of the motor-inverter assembly.

$P_{mec}$: the mechanical power of the motor system, expressed in Watt, $V_{DC}$: the supply voltage of the inverter, expressed in Volt, $I_{DCstatmin}$: the static regeneration threshold, expressed in Ampere.

The dynamic regeneration threshold $I_{DCdynmin}$ is selected by the user of the method. It corresponds to a minimum acceptable value of the DC supply current $I_{DCdyn}$ of the inverter when the motor 12 is in a virtual dynamic situation, that is to say an imaginary situation in which only an evolution of the AC supply current of the motor is taken into account.

In the virtual dynamic situation, it is possible to write:

$$P_{dyn}=V_{DC} \cdot I_{DCdyn} \qquad \text{[Math 18]}$$

With $P_{dyn}$: the magnetizing power of the motor stator, expressed in Watt. The magnetizing power $P_{dyn}$ is positive when the magnetic energy of the stator increases, that is to say during magnetization, and negative when the magnetic energy of the stator decreases that is to say during demagnetization.

$V_{DC}$: the supply voltage of the inverter, expressed in Volt.

$I_{DCdyn}$: the DC supply current of the inverter, expressed in Ampere, in a dynamic situation. The DC supply current $I_{DCdyn}$ is negative when the magnetizing power $P_{dyn}$ is negative, and positive when the magnetizing power $P_{dyn}$ is positive.

The dynamic regeneration threshold corresponds to the minimum value which is allowed for the demagnetization of the stator in a virtual dynamic situation, that is to say:

$$P_{dyn} \geq V_{DC} \cdot I_{DCdynmin} \qquad \text{[Math 19]}$$

With $P_{dyn}$: the magnetizing power of the motor stator, expressed in Watt, $V_{DC}$: the supply voltage of the inverter, expressed in Volt, $I_{DCdynmin}$: the dynamic regeneration threshold, expressed in Ampere.

The dynamic regeneration threshold $I_{DCdynmin}$ is selected to be negative.

The general principle of the method is to determine, in the first determination step E1, the AC supply current of the motor in a virtual static situation so that the DC supply current $I_{DCstat}$ of the inverter is in particular greater than or equal to the static regeneration threshold $I_{DCstatmin}$, then to modify, only and if necessary, the intermediate value of the direct axis current $I_{dstat}$ of the AC supply current of the motor 12 in a virtual static situation so that the DC supply current $I_{DCdyn}$ of the inverter in a virtual dynamic situation is less than or equal to the dynamic regeneration threshold $I_{DCdynmin}$. Thus, the intermediate value of the quadrature axis current $I_{qstat}$ becomes the target value of the quadrature axis current $I_{qcible}$. Indeed, the motor torque T12 being mainly controlled by the quadrature axis current, it is not possible to modify the value of this current without varying the motor torque T12. However, it is possible to at least partially counterbalance the produced regenerative current by a decrease in the quadrature axis current by a simultaneous increase in the direct axis current so as to contain the sum of the two. Finally, it is thus possible to guarantee that the DC supply current $I_{DC}$ of the inverter in an actual situation is greater than or equal to the global regeneration threshold $I_{DCmin}$, that is to say:

$$I_{DC} \geq I_{DCmin}=I_{DCstatmin}+I_{DCdynmin} \qquad \text{[Math 20]}$$

With:

$I_{DC}$: the DC supply current of the inverter, expressed in Ampere;

$I_{DCdynmin}$: the dynamic regeneration threshold, expressed in Ampere.

$I_{DCstatmin}$: the regeneration threshold, expressed in Ampere.

$I_{DCmin}$: the global regeneration threshold, expressed in Ampere.

Of course, the invention is not limited to the embodiments described and represented in the appended figures. Modifications are still possible, in particular with regards to the constitution of the various elements or by substitution with technical equivalents, yet without departing from the scope of protection of the invention.

The invention claimed is:

1. A method for controlling a synchronous type electric motor, supplied with an AC supply current from at least one inverter, the inverter being driven by at least one microcontroller using a vector control method, the method being executed by the microcontroller and comprising at least:

one first determination step in which an intermediate value of a direct axis current ($I_{dstat}$) and an intermediate value of a quadrature axis current ($I_{qstat}$) of the AC supply current of the motor are determined as a function of at least:

one reference setpoint torque ($C_{ref}$) that is determined by the microcontroller to be applied by the motor or one reference value of the quadrature axis current ($I_{qref}$) that is determined by the microcontroller in a preliminary determination step, one rotational speed ($\Omega$) of said motor, one supply voltage ($V_{DC}$) of the inverter, one static regeneration threshold ($I_{DCstatmin}$) and, one reference value of the direct axis current ($I_{dref}$) that is determined by the microcontroller in the preliminary determination step, one second determination step in which a target value of the direct axis current ($I_{dcible}$) and a target value of the quadrature axis current ($I_{qcible}$) are determined as a function of at least:

the intermediate value of the direct axis current ($I_{dstat}$), the intermediate value of the quadrature axis current ($I_{qstat}$), one dynamic regeneration threshold ($I_{DCdynmin}$), wherein a global regeneration threshold ($I_{DCmin}$) corresponds to a sum of the static regeneration threshold ($I_{DCstatmin}$) and the dynamic regeneration threshold ($I_{DCdynmin}$), and the static regeneration threshold and the dynamic regeneration threshold are selected by a user of the method so that the global regeneration threshold is less than or equal to 0 A (Ampere), one driving step in which the at least one inverter is driven by the microcontroller based on the target value of the direct axis current ($I_{dcible}$) and the target value of the quadrature axis current ($I_{qcible}$) and causing the motor to exert a torque corresponding to the one reference setpoint torque ($C_{ref}$) on a mechanical element for steering wheels in the vehicle.

2. The method according to claim 1, wherein the static regeneration threshold ($I_{DCstatmin}$) is selected to be positive, zero, or negative.

3. The method according to claim 1, wherein the dynamic regeneration threshold ($I_{DCdynmin}$) is selected to be negative.

4. The method according to claim 1, wherein the intermediate value of the quadrature axis current ($I_{qstat}$) becomes the target value of the quadrature axis current ($I_{qcible}$).

5. The method according to claim 1, comprising the preliminary determination step in which the reference value of the direct axis current ($I_{dref}$) and the reference value of the quadrature axis current ($I_{gref}$) are determined as a function of at least:

the reference setpoint torque ($C_{ref}$), the rotational speed ($\Omega$) of said motor, the supply voltage ($V_{DC}$) of the inverter.

6. The method according to claim 1, wherein the first determination step and/or the second determination step receives as input at least one system parameter selected from:

a total equivalent resistance ($R_{ac}$) on the AC side, a direct axis inductance ($L_d$) and/or quadrature axis inductance ($L_q$) of the electric motor, a magnetic flux ($\Psi$) of the electric motor, a number of pole pairs of the electric motor, a maximum allowable AC supply current of the motor.

7. The method according to claim 1, wherein the microcontroller, to carry out the first determination step, implements in real time a specific algorithm, and/or uses a solution table of the intermediate values stored in a memory.

8. The method according to claim 1, wherein the second determination step receives as input an equivalent amplitude of the current system of the motor, independently of its phase, achieved during a previous and/or current evaluation.

9. A power steering system comprising at least one motor controlled by the method according to claim 1.

* * * * *